US012719082B2

(12) United States Patent
Lucht et al.

(10) Patent No.: US 12,719,082 B2
(45) Date of Patent: Aug. 25, 2026

(54) LITHIUM BIS(TRIMETHYLSILYL) PHOSPHATE AS A NOVEL BI-FUNCTIONAL ADDITIVE FOR LITHIUM ION BATTERIES

(71) Applicants: University of Rhode Island Board of Trustees, Kingston, RI (US); GOTION, INC., Independence, OH (US)

(72) Inventors: Brett Lucht, Kingston, RI (US); Jongjung Kim, Warwick, RI (US); Venkata A.K. Adiraju, Warwick, RI (US); Jennifer Hoffmann, Elyria, OH (US); Martin Payne, Avon, OH (US)

(73) Assignees: UNIVERSITY OF RHODE ISLAND BOARD OF TRUSTEES, Kingston, RI (US); GOTION, INC., Independence, OH (US)

( * ) Notice: Subject to any disclaimer, the term of this patent is extended or adjusted under 35 U.S.C. 154(b) by 1102 days.

(21) Appl. No.: 17/685,076

(22) Filed: Mar. 2, 2022

(65) Prior Publication Data

US 2022/0285732 A1 Sep. 8, 2022

Related U.S. Application Data

(60) Provisional application No. 63/155,695, filed on Mar. 2, 2021.

(51) Int. Cl.
*H01M 10/0567* (2010.01)
*H01M 4/02* (2006.01)
(Continued)

(52) U.S. Cl.
CPC ....... *H01M 10/0567* (2013.01); *H01M 4/505* (2013.01); *H01M 4/583* (2013.01);
(Continued)

(58) Field of Classification Search
CPC .. H01M 4/505; H01M 4/583; H01M 10/0525; H01M 10/0567; H01M 10/0568;
(Continued)

(56) References Cited

U.S. PATENT DOCUMENTS

2015/0050561 A1* 2/2015 Zhang ............... H01M 10/4235 429/337
2022/0238909 A1* 7/2022 Fan .................. H01M 10/0525

FOREIGN PATENT DOCUMENTS

CN 107293790 A * 10/2017 ........ H01M 10/0567
CN 109216768 A * 1/2019 ........ H01M 10/0567

OTHER PUBLICATIONS

CN107293790a, Liang, et al. "A flame retardant lithium ion battery and an electrolyte thereof" retrieved from https://worldwide.espacenet.com/ Date: Oct. 31, 2024 (Year: 2017).*
(Continued)

*Primary Examiner* — Nicholas A Smith
(74) *Attorney, Agent, or Firm* — LOZA & LOZA, LLP; Michael Fedrick

(57) ABSTRACT

This work investigates the beneficial roles of lithium bis (trimethylsilyl) phosphate (LiTMSP) which may act as a novel bifunctional additive for lithium ion batteries, in particular, $LiNi_{0.5}Mn_{1.5}O_4$ (LNMO)/graphite cells. The cycle performance of LNMO/graphite cells is significantly improved with incorporation of LiTMSP. Trimethylsilyl functional group therein can react with HF generated through hydrolysis of $LiPF_6$ by residual water in electrolyte solution, followed by a decrease in the concentration of metal ions dissolution from the electrode. The generation of superior passivating surface film derived by LiTMSP on graphite electrode, suppressing further electrolyte reductive decomposition and deterioration/reformation caused by migrated metal ions, is confirmed. Furthermore, LiTMSP derived surface film is likely to have better lithium ions
(Continued)

conductivity with a decrease in resistance of the graphite electrode, improving rate performance of cells. The HF scavenging and film-forming effects of LTMPS are responsible for the less polarization of cells enabling to improve cycle performance.

3 Claims, 7 Drawing Sheets

(51) Int. Cl.
*H01M 4/505* (2010.01)
*H01M 4/583* (2010.01)
*H01M 10/0525* (2010.01)
*H01M 10/0568* (2010.01)

(52) U.S. Cl.
CPC ... *H01M 10/0525* (2013.01); *H01M 10/0568* (2013.01); *H01M 2004/027* (2013.01); *H01M 2004/028* (2013.01)

(58) Field of Classification Search
CPC ....... H01M 10/4235; H01M 2004/027; H01M 2004/028; Y02E 60/10
See application file for complete search history.

(56) References Cited

OTHER PUBLICATIONS

1. Tris(trimethylsilyl) Phosphite and Lithium Difluoro(oxalato)borate as Electrolyte Additives for LiNi0.5Mn1.5O4-Graphite Lithium-Ion Batteries, S. Mai, M. Xu, X. Liao, J. Hu, H. Lin, L. Xing, Y. Liao, X. Li, W. Li, Electrochem. Acta 2014, 147, 565-571. (Year: 2014).*
Han ("Distinct Reaction Characteristics of Electrolyte Additives for High-Voltage Lithium-Ion Batteries: Tris(trimethylsilyl) Phosphite, Borate, and Phosphate," Electrochimica Acta 215 (2016) pp. 455-465). (Year: 2016).*
Amine, K., et al., "Mechanism of Capacity Fade of MCMB/Li1.1[Ni1/3Mn 1/3Co1/3]0.9O2 Cell at Elevated Temperature and Additives to Improve Its Cycle Life", J. Mater. Chem. (2011), 21 (44), pp. 17754-17759.
Becker, T. A., et al., "Electric Vehicles in the United States a New Model with Forecasts to 2030", (2009), (36 pages).
Berckmans, G., et al., "Cost Projection of State of the Art Lithium-Ion Batteries for Electric Vehicles Up to 2030", Energies, (2017), 10:1314, doi:10.3390/en10091314 (20 pages).
Cano, Z. P., et al., "Batteries and Fuel Cells for Emerging Electric Vehicle Markets", Nat. Energy, (2018), 3 (4), pp. 279-289.
Carlier, D., et al., "First-Principles Investigation of Phase Stability in the O2—LiCoO2 System", Chem. Mater., (2003), 15 (13), pp. 2651-2660.
Dong, Y., et al., "Effect of Lithium Borate Additives on Cathode Film Formation in LiNi0.5Mn1.5O4/Li Cells", ACS Appl. Mater, Interfaces, (2017), 9 (24), pp. 20467-20475.
Han, J., et al., "Scavenging Materials to Stabilize LiPF 6-Containing Carbonate-Based Electrolytes for Li-Ion Batteries", Adv. Mater., (2019), 31 (20), 1804822, (12 pages).
Han, J. G., et al., "An Electrolyte Additive Capable of Scavenging HF and PF5 Enables Fast Charging of Lithium-Ion Batteries in LiPF6-Based Electrolytes", J. Power Sources, (2020), 446, 227366, (9 pages).
Jang, S. H., et al., "Silyl-Group Functionalized Organic Additive for High Voltage Ni-Rich Cathode Material", Curr. Appl. Phys., (2018), 18 (11), pp. 1345-1351.
Jongjung, Kim, et al., "Lithium Bis(trimethylsilyl) Phosphate as a Novel Bifunctional Additive for High-Voltage LiNi1.5Mn0.5O4/Graphite Lithium-Ion Batteries", ACS Appl. Mater. Interfaces, (2021), 13, pp. 22351-22360.
Jongjung, Kim, et al., "Lithium Bis(trimethylsilyl) Phosphate as an Electrolyte Additive to Improve the Low-Temperature Performance for LiNi0.8Co0.1Mn0.1O2/Grap", Journal of The Electrochemical Society, (2021), 168, 080538, (5 pages).
Kim, M.-H., et al., "Synthesis and Electrochemical Properties of Li[Ni0.8Co0.1Mn0.1]O2 and Li[Ni0.8Co0.2]O2 via Co-Precipitation", J. Power Sources, (2006), 159 (2), pp. 1328-1333.
Kim, J.-H., et al., "Understanding the Capacity Fading Mechanism in LiNi0.5Mn1.5O4/Graphite Li-Ion Batteries", Electrochim. Acta, (2013), 90, pp. 556-562.
Kim, J., et al., "Communication—A Phosphorus Pentafluoride Scavenger to Suppress Solid Electrolyte Interphase Damage at Moderately Elevated Temperature", J. Electrochem. Soc., (2017), 164 (14), pp. A3699-A3701.
Kumai, K., et al., "Gas Generation Mechanism Due to Electrolyte Decomposition in Commercial Lithium-Ion Cell", J. Power Sources, (1999), 81-82, pp. 715-719.
Lee, T. J., et al., "Solid Permeable Interface (SPI) on a High-Voltage Positive Electrode of Lithium-Ion Batteries", J. Electrochem. Soc., (2018), 165 (3), pp. A575-A583.
Lee, T. J., et al., "A Bifunctional Electrolyte Additive for High-Voltage LiNi 0.5 Mn 1.5 O 4 Positive Electrodes", ACS Appl. Mater. Interfaces, (2019), 11 (12), pp. 11306-11316.
Lu, D., et al. ". Failure Mechanism of Graphite/LiNi0.5 Mn1.5O4 Cells at High Voltage and Elevated Temperature", J. Electrochem. Soc., (2013), 160 (5), pp. A3138-A3143.
Lux, S. F., et al., "The Mechanism of HF Formation in LiPF6 Based Organic Carbonate Electrolytes", Electrochem. commun., (2012), 14 (1), pp. 47-50.
Manthiram, A., et al., "A Perspective on the High-Voltage LiMn1.5Ni0.5O 4 Spinel Cathode for Lithium-Ion Batteries", In Energy and Environmental Science; Royal Society of Chemistry, (2014), vol. 7, pp. 1339-1350.
Milien, M. S., et al., ". Lithium Bis(2,2,2-Trifluoroethyl)Phosphate Li[O2 P(OCH2CF 3 ) 2 ]: A High Voltage Additive for LNMO/Graphite Cells", J. Electrochem. Soc., (2018), 165 (11), pp. A2569-A2576.
Milien, M. S., et al., "Development of Lithium Dimethyl Phosphate as an Electrolyte Additive for Lithium Ion Batteries.", J. Electrochem. Soc., (2016), 163 (7), pp. A1369-A1372.
Noh, H.-J., et al., "Comparison of the Structural and Electrochemical Properties of Layered Li[NixCoyMnz]O2 (x=1/3, 0.5, 0.6, 0.7, 0.8 and 0.85) Cathode Material for Lithium-Ion Batteries", J. Power Sources, (2013), 233, pp. 121-130.
Ohzuku, T., et al., "Solid-State Redox Potentials for Li[Me1/2Mn3/2]O4 (Me: 3d-Transition Metal) Having Spinel-Framework Structures: A Series of 5 Volt Materials for Advanced Lithium-Ion Batteries", J. Power Sources, (1999), 81-82, pp. 90-94.
Patoux, S., et al., "High Voltage Spinel Oxides for Li-Ion Batteries: From the Material Research to the Application", J. Power Sources, (2009), 189 (1), pp. 344-352.
Pieczonka, N. P. W., et al. "Understanding Transition-Metal Dissolution Behavior in LiNi 0.5Mn1.5O4 High-Voltage Spinel for Lithium Ion Batteries", J. Phys. Chem. C, (2013), 117 (31), pp. 15947-15957.
Qi, X., et al., "Lifetime Limit of Tris(Trimethylsilyl) Phosphite as Electrolyte Additive for High Voltage Lithium Ion Batteries", RSC Adv., (2016), 6 (44), pp. 38342-38349.
Reimers, J. N., "Electrochemical and In Situ X-Ray Diffraction Studies of Lithium Intercalation in LixCoO2", J. Electrochem. Soc., (1992), 139 (8), pp. 2091-20967.
Schmuch, R., et al., "Performance and Cost of Materials for Lithium-Based Rechargeable Automotive Batteries", Nat. Energy, (2018), 3 (4), pp. 267-278.
Song, Y. M., et al., "A Multifunctional Phosphite-Containing Electrolyte for 5 V-Class LiNi 0.5Mn1.5O4 Cathodes with Superior Electrochemical Performance", J. Mater. Chem. A, (2014), 2 (25), pp. 9506-9513.
Takahashi, K., et al., "Electrochemical and Structural Properties of a 4.7 V-Class LiNi0.5Mn1.5O4Positive Electrode Material Prepared with a Self-Reaction Method", J. Electrochem. Soc., (2004), 151 (1), pp. A173-A177.
Wotango, A. S., et al., "Improved Interfacial Properties of MCMB Electrode by 1-(Trimethylsilyl)Imidazole as New Electrolyte Addi-

(56) References Cited

OTHER PUBLICATIONS tive to Suppress LiPF6 Decomposition", ACS Appl. Mater. Interfaces, (2017), 9 (3), pp. 2410-2420.
Wu, S., et al., "Stabilizing LiCoO2/Graphite at High Voltages with an Electrolyte Additive", ACS Appl. Mater. Interfaces, (2019), 11 (19), pp. 17940-17951.
Xie, S., et al., "Design and Synthesis of Theranostic Antibiotic Nanodrugs That Display Enhanced Antibacterial Activity and Luminescence", Proc. Natl. Acad. Sci. U. S. A., (2017), 114 (32), pp. 8464-8469.
Xu, M., et al., "Experimental and Theoretical Investigations of Dimethylacetamide (DMAc) as Electrolyte Stabilizing Additive for Lithium Ion Batteries", J. Phys. Chem. C, (2011), 115 (13), pp. 6085-6094.
Yamagiwa, K., et al., "Improved Higherature Performance and Surface Chemistry of Graphite/LiMn2O4 Li-Ion Cells by Fluorosilane-Based Electrolyte Additive", Electrochim. Acta, (2015), 160, pp. 347-356.
Yang, H., et al., "Thermal Stability of LiPF6 Salt and Li-Ion Battery Electrolytes Containing LiPF6", J. Power Sources, (2006), 161 (1), pp. 573-579.
Yang, L., et al., "Electrolyte Reactions with the Surface of High Voltage LiNi0.5Mn1.5O4 Cathodes for Lithium-Ion Batteries", Electrochem. Solid-State Lett., (2010), 13 (8), pp. A95-A97.
Yang, G., et al., "Improving the Cyclability Performance of Lithium-Ion Batteries by Introducing Lithium Difluorophosphate (LiPO2 F2 ) Additive", RSC Adv., (2017), 7 (42), pp. 26052-26059.
Yang, J., et al., "4-(Trimethylsilyl) Morpholine as a Multifunctional Electrolyte Additive in High Voltage Lithium Ion Batteries", J. Electrochem. Soc., (2020), 167 (7), 70533, (7 pages).
Yim, T., "Tris(Trimethylsilyl) Phosphite as an Efficient Electrolyte Additive to Improve the Surface Stability of Graphite Anodes", ACS Appl. Mater. Interfaces, (2017), 9 (38), pp. 32851-32858.
Yoon, T., et al., "Investigation of Electrolyte Oxidation and Film Deposition Characteristics at High Potentials in a Carbonate-Based Electrolyte Using Pt Electrode", J. Electrochem. Soc., (2018), 165 (5), pp. A1095-A1098.
Zhong, Q., "Synthesis and Electrochemistry of LiNixMn2—xO4", J. Electrochem. Soc., (1997), 144 (1), pp. 205-213.

* cited by examiner

LITHIUM BIS(TRIMETHYLSILYL) PHOSPHATE AS A NOVEL BI-FUNCTIONAL ADDITIVE FOR LITHIUM ION BATTERIES

CROSS-REFERENCE TO RELATED APPLICATIONS

This application claims the benefit of priority under 35 U.S.C. § 119(e) from U.S. Patent Application No. 63/155,695, filed Mar. 2, 2021. The disclosure of the foregoing application and other publications cited herein are incorporated by reference in their entirety.

STATEMENT REGARDING FEDERALLY SPONSORED RESEARCH OR DEVELOPMENT

This invention was made with government support under grant number DE-EE0006250 awarded by the United States Department of Energy. The government has certain rights in the invention.

TECHNICAL FIELD

This disclosure relates to Lithium Bis(Trimethylsilyl) Phosphate (LiTMSP) as a novel bi-functional additive for lithium ion batteries.

BACKGROUND ART

With a gradual increasing market share of hybrid electric vehicles (HEV) and electric vehicles (EVs) around the world, lithium-ion batteries (LIBs) have been required to have much higher energy density to expand the driving range for EVs.[1,2] The energy density is deeply associated with voltage (V) and capacity (Q), some high-voltage or high-capacity positive materials are reviewed to be incorporated in commercial LIBs. High nickel layered oxides such as $LiNi_{2-x}Co_xMnxO_2$ (NCM, x≤0.1) have been promising candidates for high capacity (>200 mAh g-1).[3,4] However, these High nickel layered oxides have problems associated with price due to the skyrocketing cost of cobalt (Co).[5,6]

Spinel $LiNi_{0.5}Mn_{1.5}O_4$ (LNMO) has been an alternative candidate for its superior rate capability and cost competitiveness, as well as high working voltage (beyond 4.7 V (vs. $Li/Li^+$)) with structure reversibility,[7-10] compared to commercial layered oxides which are cut off to 4.3 V due to their structural instability.[11,12] The advantage for the high voltage of LNMO is however offset due to the instability of conventional $LiPF_6$/carbonate-based electrolytes on high oxidative positive electrodes.[13-15] The continuous electrolyte oxidation on the surface of electrode/electrolyte causes gas ($CO_2$) and water ($H_2O$) production, and film deposition at the surface of electrodes.[14-18] Furthermore, metal ions (nickel (Ni) and manganese (Mn)) dissolution by hydrogen fluoride (HF) which is generated through the hydrolysis of lithium hexafluorophosphate ($LiPF_6$) by residual water in electrolytes solutions gives rise to the depletion of available lithium ions and deterioration/reformation of the SEI layers on graphite electrodes,[17,19] when especially paired with graphite electrodes (LNMO/graphite cells), which results in increasing the resistance of the cells and steadily decreasing capacity utilization.[20-23]

Incorporation of the specific additives into electrolytes solutions is an accessible countermeasure leading to solving the issues. The specific functions of the additives like are scavenging corrosive acid species like HF or phosphorus pentafluoride ($PF_5$),[24-29] or passivating the surface film on the electrode,[30-34] depend on the functional groups in the additives. It was reported that siloxane derivatives like silyl group (Si—O) can capture HF or H2O to form silyl fluoride (Si—F).[25,28,35] Lithium phosphate derivatives such as lithium difluorophosphate ($LiPO_2F_2$) and lithium dimethyl phosphate (LiDMP) were reported to improve the cycle and rate performance of NCM/graphite cells with modifying the chemical composition of solid electrolyte interphase (SEI) layers on graphite electrodes.[32,33] Moreover, the additives could be multi-functionally worked when having multi different kinds of functional groups.[27,35-37]

DISCLOSURE OF THE INVENTION

Technical Problem

It is an object of the disclosure to provide a novel additive for a lithium ion battery, which can effectively act as a HF scavenger and film-forming agent simultaneously, decrease the resistance of the lithium ion battery and improve the cycling performance and rate performance of the lithium ion battery, and a lithium ion battery comprising the same.

Technical Solution

In order to achieve the above objects, an aspect of the disclosure provides an additive for a lithium ion battery, comprising lithium bis(trimethylsilyl) phosphate (LiTMSP).

The LiTMSP may be prepared by thermolysis of tris (trimethylsilyl) phosphate and lithium tert-butoxide.

Preferably, the additive is added in an electrolyte such that the content of LiTMSP in the electrolyte is 5 wt % or less.

Preferably, the additive is added in an electrolyte such that the content of LiTMSP in the electrolyte is from 0.5 wt % to 1.0 wt %.

Preferably, the lithium ion battery comprises $LiNi_{0.5}Mn_{1.5}O_4$ (LNMO) as a positive electrode and/or graphite as a negative electrode.

Preferably, the lithium ion battery comprises an electrolyte containing lithium hexafluorophosphate ($LiPF_6$).

Another aspect of the disclosure provides a lithium ion battery comprising a positive electrode, a negative electrode and an electrolyte, wherein the electrolyte comprises lithium bis(trimethylsilyl) phosphate (LiTMSP) as an additive.

Preferably, the content of LiTMSP in the electrolyte is 5 wt % or less.

Preferably, the content of LiTMSP in the electrolyte is from 0.5 wt % to 1.0 wt %.

Preferably, the positive electrode is $LiNi_{0.5}Mn_{1.5}O_4$ (LNMO) electrode, and/or the negative electrode is a graphite electrode.

Preferably, the electrolyte comprises lithium hexafluorophosphate ($LiPF_6$).

Advantageous Effects

In this work, a novel additive, lithium bis(trimethylsilyl) phosphate (LiTMSP) involving two functional groups (siloxane and phosphate), has been synthesized and tested for LNMO/graphite cells. Systematic in-situ and ex-situ analysis have been investigated to reveal the mechanism of beneficial effects of LiTMSP as a HF scavenger and film-forming agent, simultaneously. The function of HF scavenging of LiTMSP was investigated by $^{19}F$ nuclear magnetic resonance (NMR). The concentration of metal ion deposition of the graphite electrode was measured through Inductively Coupled Plasma Mass Spectrometry (ICP-MS). The superior passivating film on the graphite electrode was confirmed via a combination of chronoamperometry, X-ray Photoelectron Spectroscopy (XPS), and Field-Emission Scanning Electron Microscopy (FE-SEM).

The trimethylsilyl functional group in LiTMSP could scavenge HF in electrolyte solution by generating TMS-F, which results in decreasing the metal ion dissolution from the LNMO electrode during cycling at 45° C. As a result, the resistance of LNMO electrode cells after 100 cycles at 45° C. was dramatically decreased with the incorporation of LiTMSP.

Thanks to the superior surface film derived by LiTMSP on the graphite electrode, the passivation ability of the surface film is enhanced, which enables further mitigation of electrolyte reductive decomposition and deterioration/reformation caused by migrated metal ions from the LNMO electrode. This leads to a decrease in the resistance of LNMO/graphite cells and improves the cycling performance of LNMO/graphite cells at 45° C.

Besides, the surface film derived by LiTMSP could decrease the resistance of the graphite electrode due to the improved lithium-ions conductivity, offering the better rate performance of LNMO/graphite cells at 25° C.

MODE FOR CARRYING OUT THE INVENTION

Figure 1:
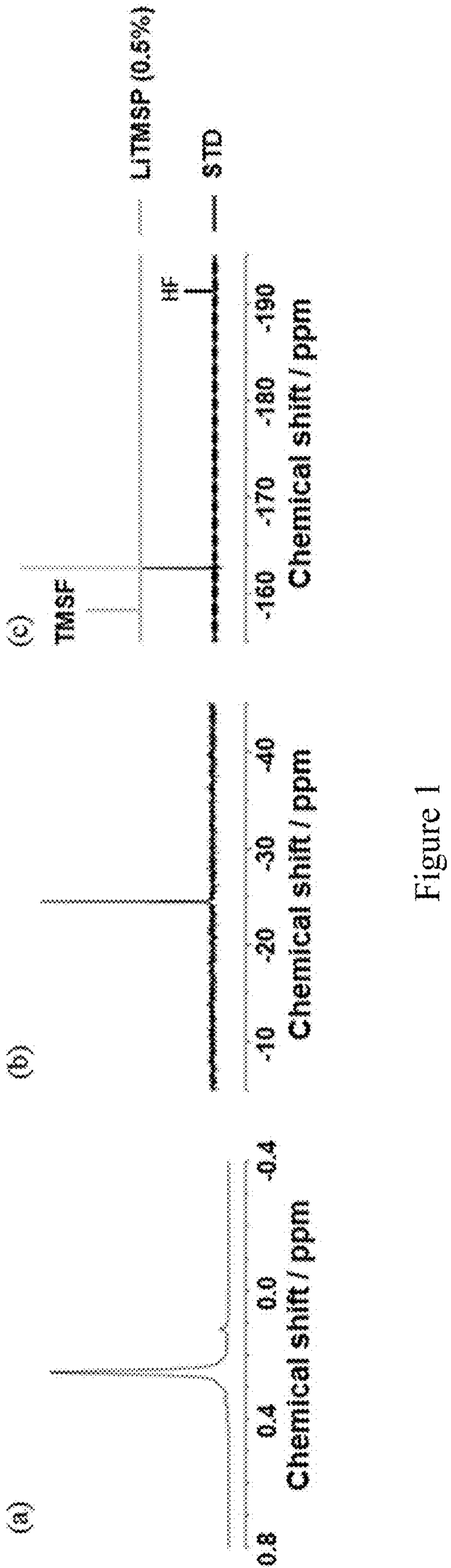
FIG. 1 shows: (a) $^1$H NMR, and (b) $^{31}$P NMR spectra of LTMSP powder in $C_6D_6$, (c) $^{19}$F NMR spectra of STD and LTMSP (0.5%) electrolytes.

Hereinafter, the present invention will be described in detail with reference to the following examples. However, these examples are presented for illustrative purposes only, and the scope of the invention is not limited thereto.

EXPERIMENTAL SECTIONS

Synthesis and characterization. All manipulations were carried out using standard vacuum, Schlenk, or glovebox techniques. All chemicals were purchased from Aldrich and used as received. Glassware was oven-dried at 150° overnight. $^1$H, $^{13}$C, and $^{31}$P NMR spectra were recorded on a Bruker Ascend 400 MHz spectrometer. Melting points were obtained on a Mel-Temp II or SMP 10 apparatus and were not corrected.

Lithium bis(trimethylsilyl) phosphate (LiTMSP). Tris(trimethylsilyl) phosphate (2.1 g, 6.71 mmol) and 1.0 M lithium tert-butoxide solution in hexanes (6.7 mL, 6.71 mmol) were added to toluene (20 mL) in 250 mL flask. The suspension was refluxed under nitrogen atmosphere overnight. The volatiles were removed under reduced pressure to give white solid. The residue was washed with hexanes and dried in vacuum to obtain white powder. Yield: 1.36 g, 82%. M.p.: >250° C. $^1$H NMR (400 MHz, $C_6D_6$) δ 0.25 (s, 18H, $CH_3$); $^{13}$C NMR (101 MHz, $C_6D_6$) δ 0.73; $^{31}$P {$^1$H} NMR (162 MHz, $C_6D_6$) δ−24.5 (s).

Electrodes and electrolytes preparation and electrochemical cells. $LiNi_{0.5}Mn_{1.5}O_4$ (LNMO) electrodes (active material ratio: 93.5%, binder: poly(vinylidenefluoride, PVdF) and graphite electrodes (active material ratio: 96.5%, binder: PVdF) from the commercial manufacturer were used as a positive and negative electrode. The deviation of loading of electrodes is ±0.01 (LNMO), ±0.02 (graphite) mg cm-1 respectively. The areal capacity of LNMO electrodes was 0.24 mAh $cm^{-2}$ and graphite electrodes was 0.45 mAh $cm^{-2}$, respectively. The electrodes were dried overnight at 110° C. to eliminate residual moisture. The lithium bis(trimethylsilyl) phosphate (LiTMSP) was added in standard electrolyte (referred to as STD, 1.2 M $LiPF_6$ EC:PC:DEC=15:20:65 (volume percent, vol %)) from Gotion Inc. with a weight percent (wt %) of 0.5 and 1.0 (referred to as LiTMSP electrolyte). CR2032-type coin cells were assembled with LNMO (12.7 mm diameter) and graphite (14 mm diameter) electrodes, three separators (Celgard 2325 (15, 19 mm diameter), Whatman GF/D glass microfiber filter (15.6 mm diameter)), 100 μL electrolyte solutions in argon atmosphere glove box.

Electrochemical measurements. The LNMO/graphite cells were galvanostatically pre-cycled 5 times at 25° C. (pre-cycling) using battery cycler (Arbin BT 2000). The cells were cycled at 3.3-4.9 V with a current density of 105.4 mA (0.1 C) in the first two cycles. And then, the cells were cycled with a current density of 527.0 mA (0.5 C) for two cycles and 1054.0 mA (1 C) for two cycles with the same voltage range. After pre-cycling, the rate testing was conducted seven cycles at 25° C. The cells were charged with a rate of 0.5 C (4.9 V) and discharged with a rate of 0.5 C, 0.2 C, 0.5 C, 1 C, 1.5 C, 2 C, and 0.2 C (3.3 V), respectively. After rate testing, the cells were cycled at 3.3-4.9V with a rate of 1 C at 25 and 45° C. Constant voltage (CV) step was applied at 4.9 V at the end of charge in every cycle.

At initial and 100 cycles at 45° C., the cells were charged to 4.69 V and rested for 24 hours to measure the resistance of LNMO/graphite cells, LNMO/LNMO symmetric cells, and graphite/graphite symmetric cells from electrochemical impedance spectroscopy (EIS) with a 5 mV amplitude from 0.02 Hz to $5\times10^5$ Hz (BioLogic VSP).

For chronoamperometry, after the LNMO/graphite cells were cycled five times to be cut at 4.9 V at 25° C., the LNMO/graphite cells were moved into 45° C. and CV step was applied at 4.9 V for 5 hours to monitor the current decay.

X-ray Photoelectron Spectroscopy (XPS). The initial chemical composition of the surface film on LNMO and graphite electrode depending on the concentration of LiTMSP was measured by XPS. After pre-cycling, the LNMO/graphite cells were disassembled in the argon-filled glove box and harvested electrodes were rinsed with dimethyl carbonate (DMC) three times to eliminate residual electrolytes. The electrodes were transferred from the glove box to the instrument chamber using a vacuum-sealed transfer module without air exposure. The XPS was conducted using a K-alpha spectrometer (Thermo Scientific) with Al Kα radiation (hv=1486.6 eV) and a spot size of 400 μm. The obtained spectra were calibrated based on the peak of hydrocarbons at 284.5 eV in C 1s.

Nuclear magnetic resonance (NMR) spectroscopy. The scavenging effect of LiTMSP on hydrogen fluoride (HF) in $LiPF_6$/carbonate-based electrolyte was confirmed by Bruker Ascend 400 Mhz NMR spectrometer. $^{19}$F-NMR of standard electrolyte and LiTMSP (0.5 wt %) containing electrolytes were measured. To compare the concentration of HF in electrolyte solution after 100 cycles at 45° C., the cycled LNMO/graphite cells were disassembled in the glove box followed by the harvested separators (Celgard 2325, Whatman GF/D glass microfiber filter) were immersed into 1 ml standard electrolyte solution (1.2 M $LiPF_6$ EC:PC:DEC=15:20:65 (v:v:v)) for 24 hours, respectively. The samples were prepared inside the argon filled glovebox. The electrolyte solution was added to dry NMR tubes with capillaries containing DMSO-d6 and C6F6. $^{19}$F NMR were referenced to hexaflurobenzene at −162.65 ppm.

Field-Emission Scanning Electron Microscopy (FE-SEM). The morphology of surface film on LNMO and graphite electrode was examined by FE-SEM (SIGMA VP). The initial and cycled (at 45° C.) LNMO and graphite electrodes which were harvested from the LNMO/graphite cells were rinsed with DEC three times and then transferred to the chamber of FE-SEM without exposure of air.

Inductively Coupled Plasma Mass Spectrometry (ICP-MS). The concentration of metal ion deposition (Ni, Mn) on the graphite electrode after 100 cycles at 45° C. was measured through iCAP Q ICP-MS. The cycled graphite electrodes were rinsed with DMC three times, and then dissolved into 2% HNO3 solution (10 ml) and sonicated followed by being diluted two times. The concentration of metal ion deposition was obtained by a five-point calibration curve.

RESULTS AND DISCUSSION

The 1:1 stoichiometric mixture of tris(trimethylsilyl) phosphate and lithium tert-butoxide solution in hexanes was refluxed at 80° C. in toluene and the suspension was transformed to colorless solution (Scheme 1). After removing the volatiles in vacuo a white solid was isolated. An $^{1}$H NMR spectrum was acquired of the white solid in $C_6D_6$, revealing a singlet at 0.25 ppm belonging to the methyl group (FIG. 1 (*a*)) and $^{31}P\{^{1}H\}$ NMR spectroscopy revealed a singlet at −24.5 ppm (FIG. 1 (*b*)). Multiple attempts to grow single crystals for X-ray diffraction from various solvents were unsuccessful. Subsequent workup of reaction led to isolation of LiTMSP as white powder in 82% yield.

Scheme 1. Synthesis processes of lithium tris(trimethylsilyl) phosphate.

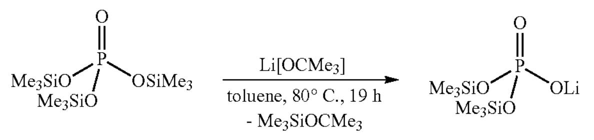

To investigate the beneficial role of LiTMSP as an HF scavenger, the $^{19}$F NMR spectra of fresh standard electrolyte and LiTMSP added electrolytes (0.5 wt %) are compared in FIG. 1 (*c*).

The $^{19}$F NMR spectra of STD electrolyte shows the two peaks. The peak at −162.65 ppm is characteristic of internal reference (hexafluorobenzene),[38] a small peak characteristic of HF which is generated by the hydrolysis of residual water in electrolyte solutions is observed at −191.4 ppm,[35] suggesting the generation of HF in the electrolyte solution is inevitable despite the strict moisture-controlled conditions for manufacture. However, when the LiTMSP is incorporated into the electrolyte solutions with a 0.5% weight percent, $^{19}$F NMR spectra is completely different showing the peak of HF at −191.4 ppm disappears and new peak characteristic of trimethylsilyl fluoride (TMS-F) is observed at −158.4 ppm,[35] demonstrating the concentration of 0.5 wt % of LiTMSP can scavenge the initial HF in electrolyte solutions through chemical reaction of LiTMSP and HF leading to generate TMS-F.

Figure 2:
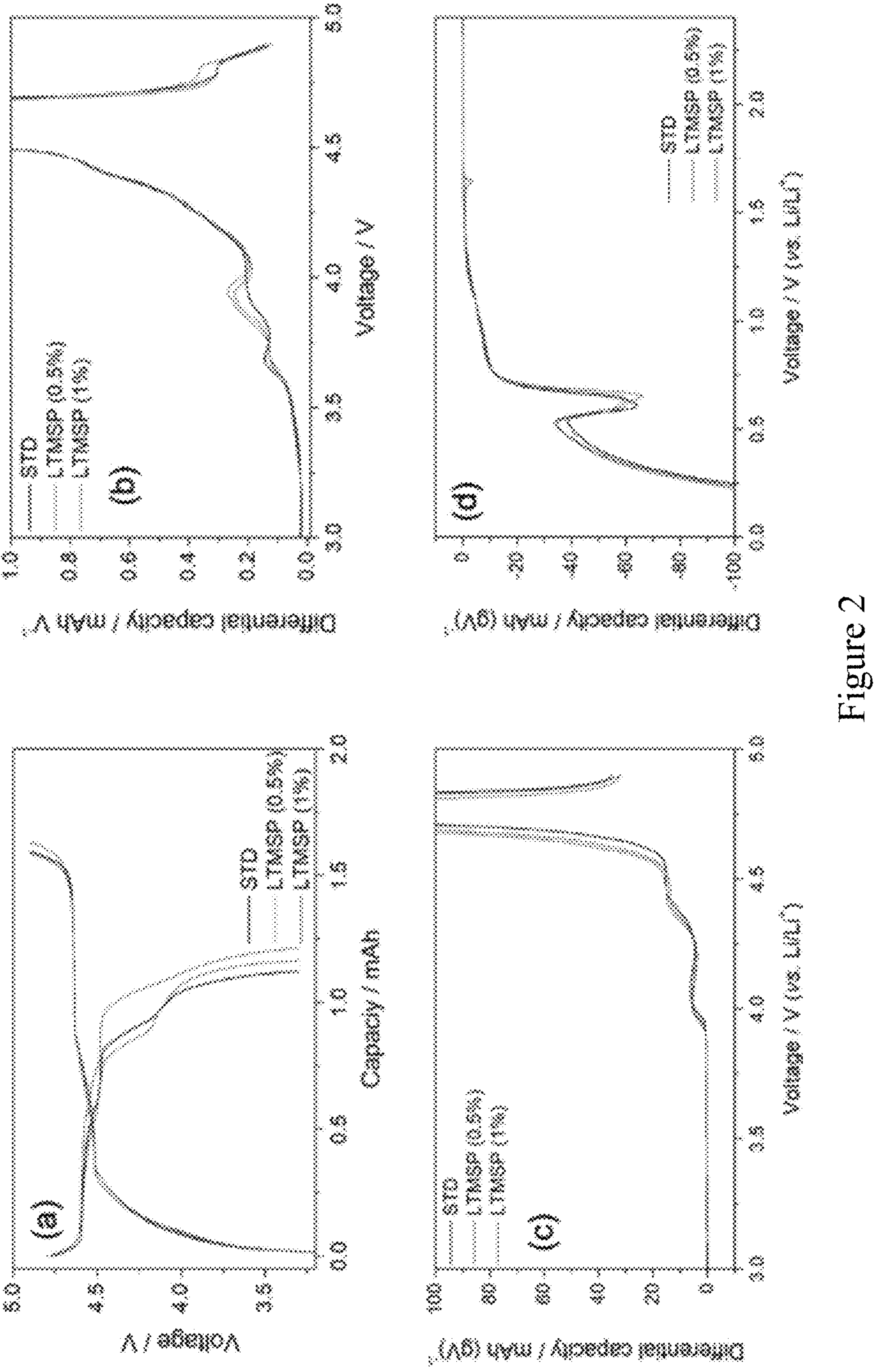
FIG. 2 shows: (a) Voltage profiles of LNMO/Gr cells with STD and LTMSP (0.5%, 1%) at 1st cycle, dQ/dV plots of (b) LNMO/Gr cells, (c) Li/LNMO cells, and (d) Li/Gr cells with STD and LTMSP (0.5%, 1%) electrolytes at 1st cycle.

The LNMO/graphite cells are pre-cycled with different concentrations of LiTMSP (0, 0.5, and 1 wt %). The comparison of galvanostatic voltage profiles of LNMO/graphite cells for the 1st cycle of pre-cycling is shown in FIG. 2 (*a*). LNMO/graphite cells gradually deliver higher discharge capacity as the concentration of LiTMSP is increased (STD: 1.12 mAh, LiTMSP (0.5%): 1.16 mAh, LiTMSP (1%): 1.21 mAh), which is likely due to suppression of side reactions of the electrolyte which result from the generation of the surface film derived by LiTMSP, which can be seen as a small plateau at 3.9 V in voltage profiles of LNMO/graphite. Differential capacity (dQ/dV) plots of LNMO/graphite cells for the 1st cycle also clearly support the intensity of the peak for the decomposition of LiTMSP at 3.9 V increases with the higher concentration of LiTMSP (FIG. 2 (*b*)). For the further investigation of LiTMSP decomposition, the Li/LNMO and Li/graphite cells are fabricated with STD and LTMSP electrolytes (0.5 and 1 wt %) and tested at 25° C. The dQ/dV plots of Li/LNMO cells with LiTMSP for the 1st cycle are similar but slightly shifted forward compared to STD, showing the oxidation peak of ethylene carbonate (EC) over 4.0 V (vs. $Li/Li^+$). However, a small reduction peak at 1.6 V (vs. $Li/Li^+$) is observed in dQ/dV of Li/graphite cells with the addition of LiTMSP, implying that LiTMSP appears to be electrochemically decomposed on the graphite electrode.

Figure 3:
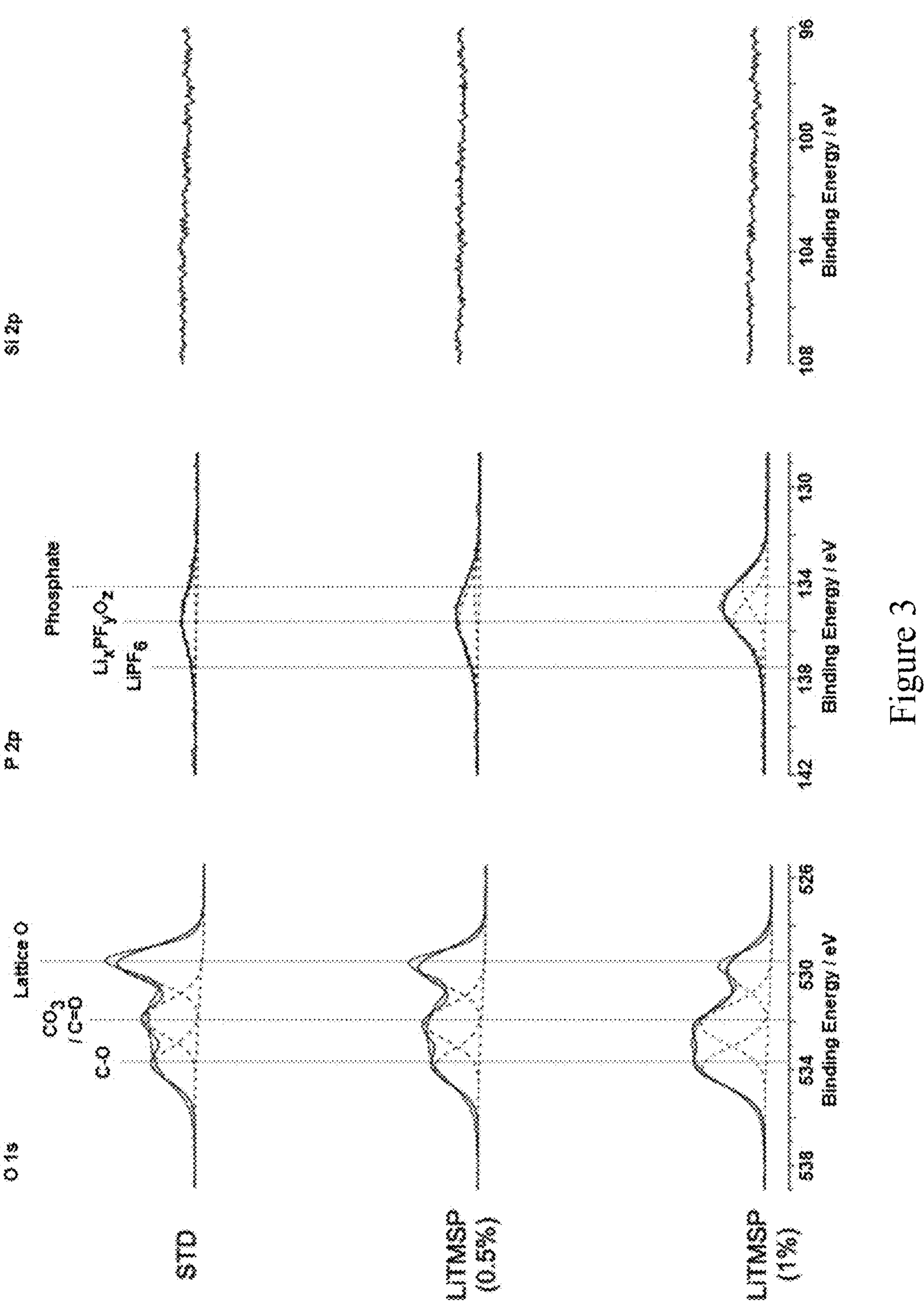
FIG. 3 shows O 1s, P 2p, and Si 2p XPS spectra of the pre-cycled LNMO electrodes obtained from LNMO/Gr cells with STD and LTMSP (0.5%, 1%) electrolytes.

To verify the surface film derived by LiTMSP, the chemical composition of the initial surface film on both LNMO and graphite electrode obtained from LNMO/graphite cells after pre-cycling is examined through XPS. The binding energy of chemical species is summarized in Table 1. FIG. 3 shows the O 1s, P 2p, and Si 2p spectra of LNMO electrodes depending on the concentration of LiTMSP. The XPS spectra demonstrate that the surface film derived by LiTMSP appears to be altered compared to the surface film by STD, supported by the dominant peak of O-species ($CO_3$/C═O at 532 eV, C—O at 533.5 eV) and $Li_xPF_yO_z$ (135.7 eV). Surprisingly, there are no observable peaks in Si 2p spectra even on the LNMO electrodes with LiTMSP, suggesting the TMS group isn't likely to participate in comprising the surface film by reacting with HF to form TMS-F as previously identified by NMR in FIG. 1 (*c*). Also, the thickness of the surface film is slightly getting thicker as a higher concentration of LiTMSP with being confirmed by the decreased peak of lattice oxygen at 529.6 eV.

Figure 4:
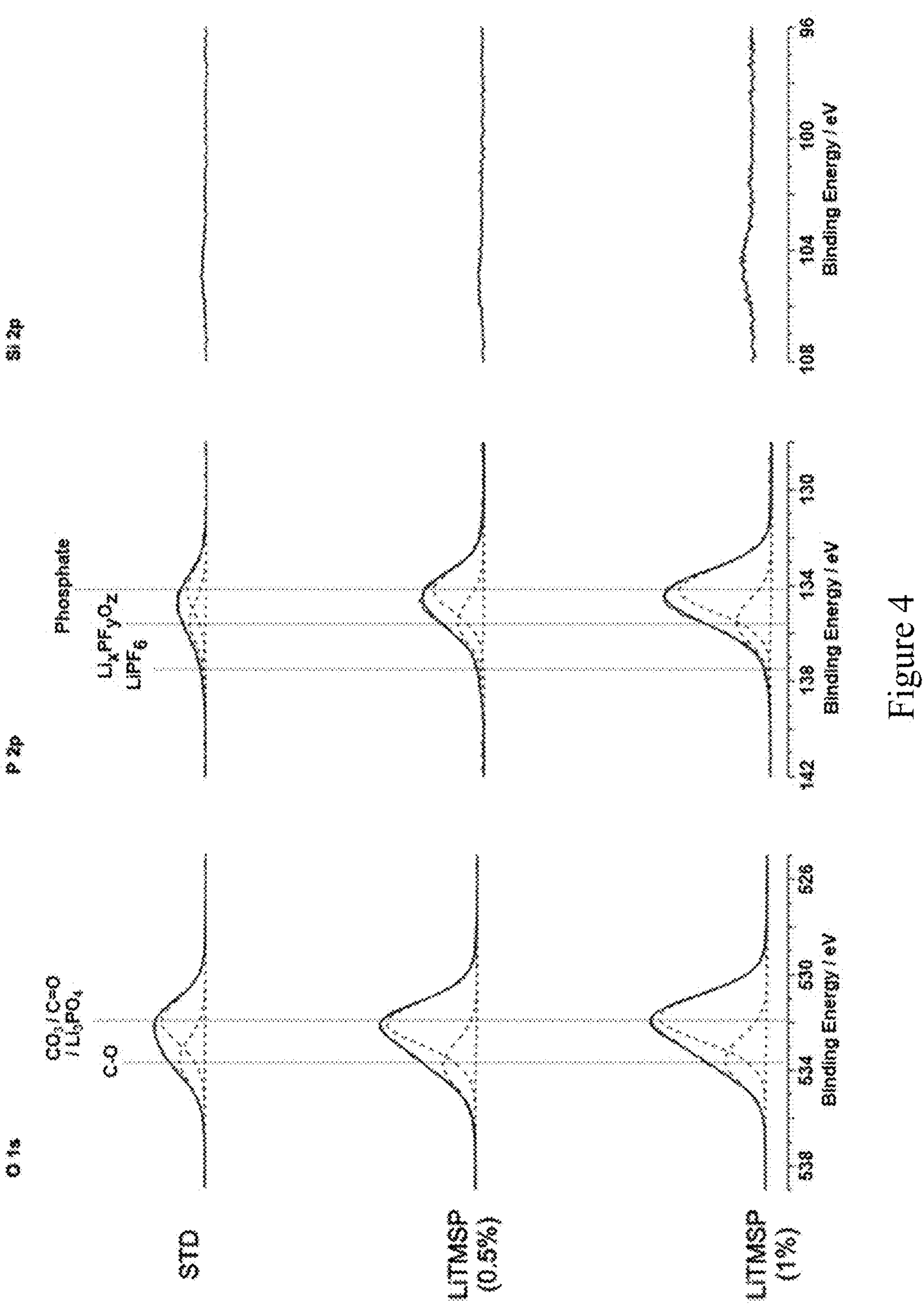
FIG. 4 shows O 1s, P 2p, and Si 2p XPS spectra of the pre-cycled graphite electrode obtained from LNMO/Gr cells with STD and LTMSP (0.5%, 1%) electrolytes.

The chemical composition of the surface film on the graphite electrode with LiTMSP (FIG. 4) is changed into significant greater peaks of O-species ($CO_3$/C═O at 532 eV) and phosphate species (134 eV), which is similar to reductive products on the graphite electrode derived by lithium dimethyl phosphate (LiDMP) in $LiNi_{1/3}Co_{1/3}Mn_{1/3}O_2$/graphite cells.[32] The intensities of peaks in Si 2p spectra obtained from the graphite electrodes with the addition of LiTMSP are negligible, suggesting that the TMS group also is not likely contributing to the generation of the surface film on graphite electrodes. Other XPS spectra including C 1s and F 1s have very similar chemical compositions on both LNMO and graphite electrodes with LiTMSP compared to STD electrolytes (FIGS. 3, 4). Table 2, 3 display the relative atomic concentrations of the initial surface films on both LNMO and graphite electrodes, indicating that the element concentrations of the surface films on the LNMO electrodes change only slightly with LiTMSP, while a significant change is observed in the graphite electrodes, where less carbon, fluorine, and more oxygen, phosphorus were detected. This suggests that LiTMSP has a preferential reaction on the surface of the graphite electrodes, rather than the LNMO electrodes which are consistent with the results of the systematic electrochemical half-cell investigations (FIGS. 2 (*c*), (*d*)).

TABLE 1

Binding energies of chemical species of the surface film on the LNMO and graphite electrodes (eV).[26, 32, 35]

| O 1s | | P 2p | | Si 2p | |
|---|---|---|---|---|---|
| Lattice O | 529.6 | Phosphate | 134 | Si—C | 100.8 |
| $CO_3$/C═O/$Li_3PO_4$ | 532 | $Li_xPF_yO_z$ | 135.7 | Si—O | 103.0 |
| C—O | 533.5 | $LiPF_6$ | 137.8 | | |

TABLE 2

Relative atomic percent of the initial surface film on the LNMO electrodes with STD and LTMSP electrolytes. Relative atomic percent (%)

| | C | O | F | P |
|---|---|---|---|---|
| STD | 52.3 | 25.3 | 21.1 | 1.4 |
| LTMSP (0.5%) | 52.5 | 24.8 | 20.6 | 2.1 |
| LTMSP (1%) | 52.5 | 26.1 | 18.4 | 3.1 |

TABLE 3

Relative atomic percent of the initial surface film on the graphite electrodes with STD and LTMSP electrolytes. Relative atomic percent (%)

| | C | O | F | P |
|---|---|---|---|---|
| STD | 42.1 | 18.1 | 36.6 | 3.2 |
| LTMSP (0.5%) | 38.8 | 21.6 | 35.2 | 4.4 |
| LTMSP (1%) | 32.6 | 27.4 | 32.7 | 7.4 |

The mechanism of the beneficial effects of LiTMSP is proposed based on NMR and XPS results (Scheme 2). Before cycling, LiTMSP reacts with HF generated by hydrolysis of residual water in electrolyte solutions, forming TMS-F and lithium phosphate ($Li_3PO_4$) (HF scavenging). TMS group in LiTMSP is likely replaced with lithium rather than hydrogen due to the higher concentration of lithium in electrolyte solutions. Then, as-generated lithium phosphate is electrochemically reduced to radical anion, which seems to be negative on oxygen bonded to phosphate. And then, the radical anion initiates polymerization with ethylene carbonate to generate phosphate containing organic surface film on the graphite electrodes (film forming).

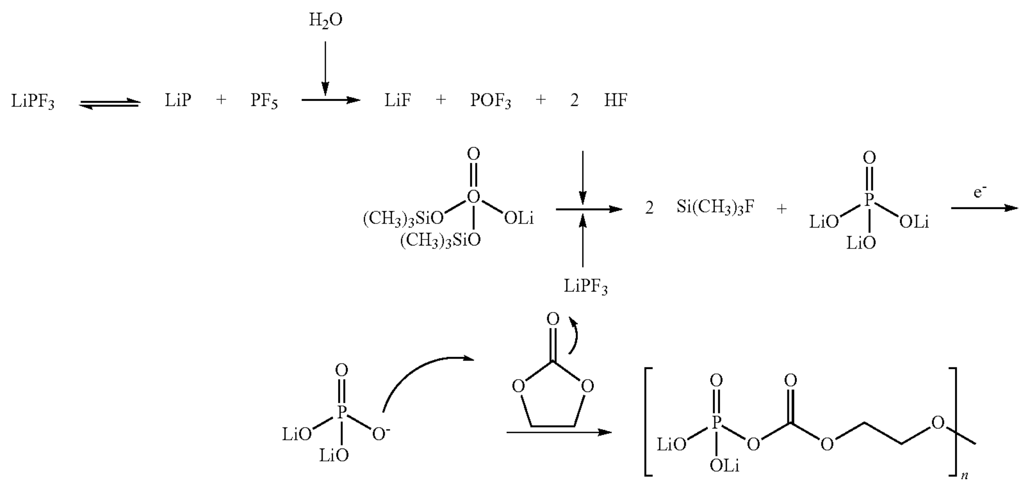

Figure 5:
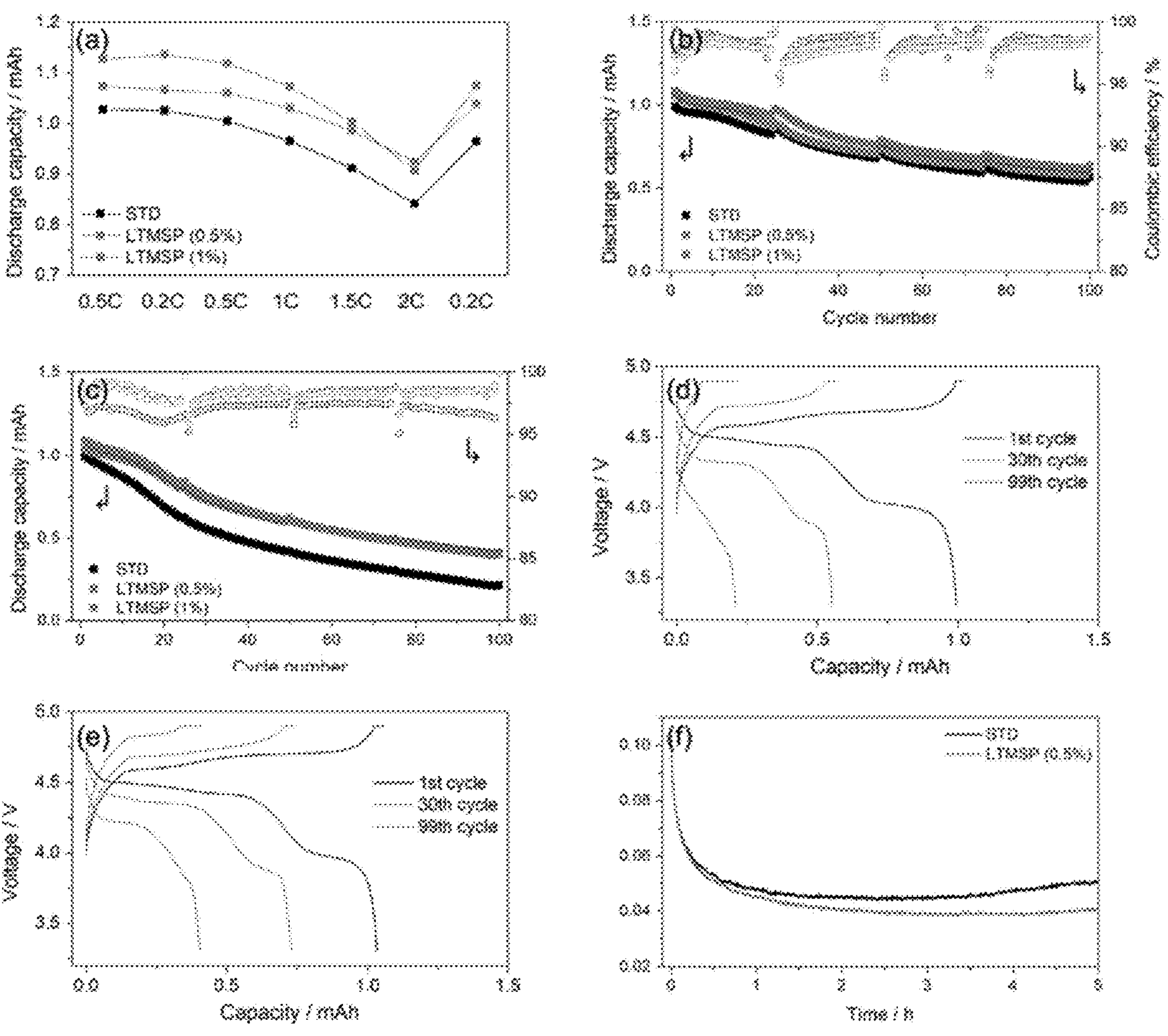
FIG. 5 shows: (a) Rate performance, (b) cycle performance of LNMO/Gr cells at 25° C. depending on the concentration of LiTMSP, (c) cycle performance, and voltage profiles of LNMP/Gr cells with (d) STD electrolytes, and (e) LTMSP (0.5%) electrolytes at 45° C. (note that the LNMO/graphite cells were cycled with a rate of 0.1 C every 25 cycles), (f) Chronoamperometry of LNMO/Gr cells with STD and LTMSP (0.5%) electrolytes at 45° C.

The rate performance of LNMO/graphite cells at 25° C. is provided in FIG. 5 (*a*). There is a trend that the LNMO/graphite cells with a higher LiTMSP deliver a higher discharge capacity with a variety of discharge rates from 0.2 C to 1.5 C, which is due to the beneficial role of LiTMSP leading to decreasing the initial resistance of LNMO/graphite cells as confirmed by electrochemical impedance spectroscopy (EIS) in FIG. 6 (*a*) (inset). To further understand the effects of LiTMSP on the resistance of LNMO and graphite electrodes, respectively, the LNMO and graphite electrodes were harvested from the LNMO/graphite cells and LNMO/LNMO and graphite/graphite symmetric cells were assembled. The initial resistance of LNMO electrodes shown in FIG. 6 (*b*) (inset), demonstrating that the difference in the film resistance ($R_{film}$) at high frequency is negligible, but the charge transfer resistance ($R_{ct}$) at low frequency is slightly reduced by LiTMSP (0.5 wt %) compared to STD. The initial resistance of graphite electrodes with the addition of LiTMSP (0.5 wt %) (FIG. 6 (*c*), inset) is more changed than LNMO electrodes, in which both $R_{film}$ and $R_{ct}$ are quite decreased compared to STD, implying the LiTMSP is likely to have a greater impact on the graphite electrodes than the LNMO electrodes initially, corresponding to the results of XPS (FIG. 4). Back to the rate performance, the one interesting feature is that the discharge capacity of LNMO/graphite cell with 0.5, 1 wt % LiTMSP are reversed with a rate of 2 C, which is likely caused by the inferior lithium-ions conductivity on graphite electrodes due to the vigorous film generation with a higher concentration of LiTMSP.

The LNMO/graphite cells were cycled at 25 and 45° C. after rate testing. The capacity retention of LNMO/graphite cells with STD at 25° C. seems to be moderate (57.1% after 100 cycles) (FIG. 5 (*b*)) whereas the capacity retention of LNMO/graphite cells with STD severely fades at 45° C. delivering only 21.8% of discharge capacity of the initial capacity after 100 cycles (FIG. 5 (*c*)). LiTMSP can significantly improve the capacity retention of LNMO/graphite cells cycled at 45° C. cells providing a capacity retention of 39.6% with 0.5 wt % of LiTMSP and 36.9% with 1 wt % LiTMSP, respectively. In addition, the Coulombic efficiency is improved.

Based on the rate and cycle testing, it is suggested that an optimal concentration of LiTMSP is 0.5 wt % for LNMO/graphite cells. Thus, the following systematic in-situ and ex-situ analysis was conducted by comparison of LNMO/graphite cells with STD and LiTMSP (0.5 wt %). It has been reported that the growth of cell polarization which results in serious cell failure is contributed by both LNMO and graphite electrodes.[23] The galvanostatic voltage profiles of LNMO/graphite cells with STD show significantly greater cell polarization upon cycling (FIG. 5 (*d*)), which is consistent with EIS results after cycling (FIG. 6 (*a*)). Further analysis of EIS for LNMO/LNMO and graphite/graphite symmetric cells with STD suggests that the both LNMO and graphite electrodes are responsible for the significant resistance growth of LNMO/graphite cells (FIGS. 6 (*b*), (*c*)), which is consistent with the literature. However, less cell polarization is observed in voltage profiles of LNMO/graphite cells with LiTMSP (FIG. 5 (*e*)) and the EIS suggests, in particular, the $R_{ct}$ of LNMO electrodes and $R_{film}$ and $R_{ct}$ of graphite electrodes are greatly reduced by LiTMSP (FIGS. 6 (*b*), (*c*)).

Figure 7:
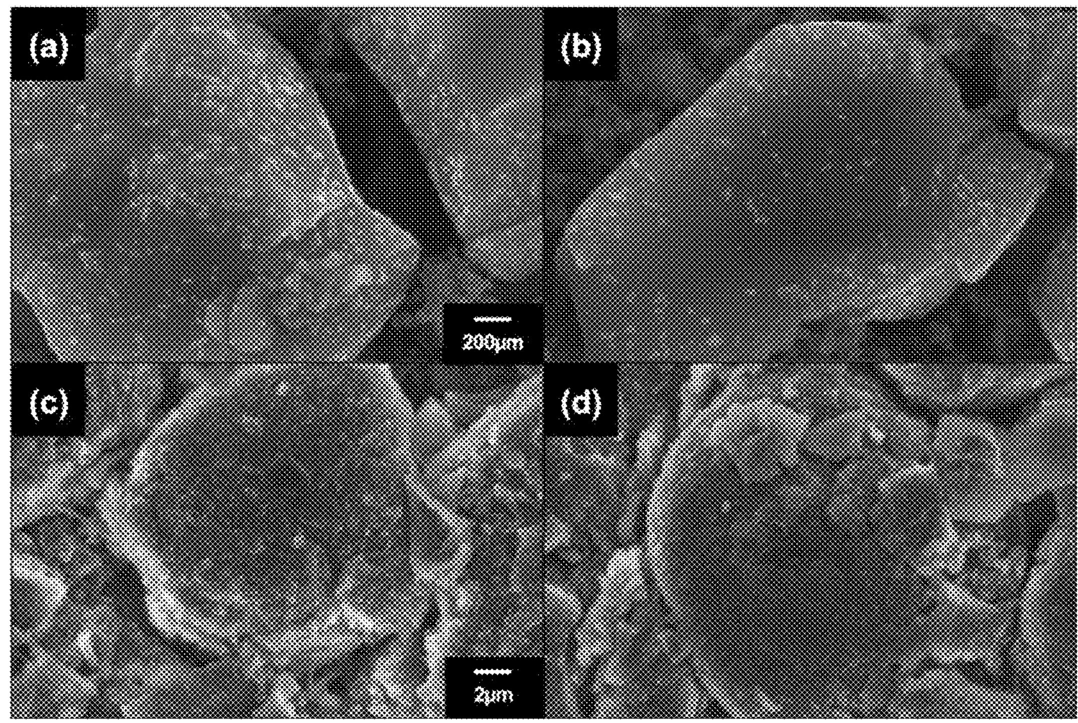
FIG. 7 shows FE-SEM images of the cycled LNMO electrodes (a) with STD, (b) with LTMSP (0.5%) electrolytes, the cycled graphite electrode (c) with STD, (d) with LTMSP (0.5%) electrolytes.

The source for the increase in the resistance of LNMO electrodes does not likely originate from the oxidation of electrolyte on the surface of the LNMO electrodes based on the similar chemical composition of the surface film on the LNMO electrodes cycled with either STD or LiTMSP after 100 cycles at 45° C. (Figure S3). The FE-SEM images also support that there are no significant differences on the surface of the LNMO electrodes after cycling (FIGS. 7 (*a*), (*b*)). Although the source of the increased resistance is not clear, it would be assumed that the change in the crystal structure of the surface of the LNMO electrode which is a result of metal ions dissolution by HF contributes to the resistance rise (especially $R_{ct}$).[20]

Figure 8:
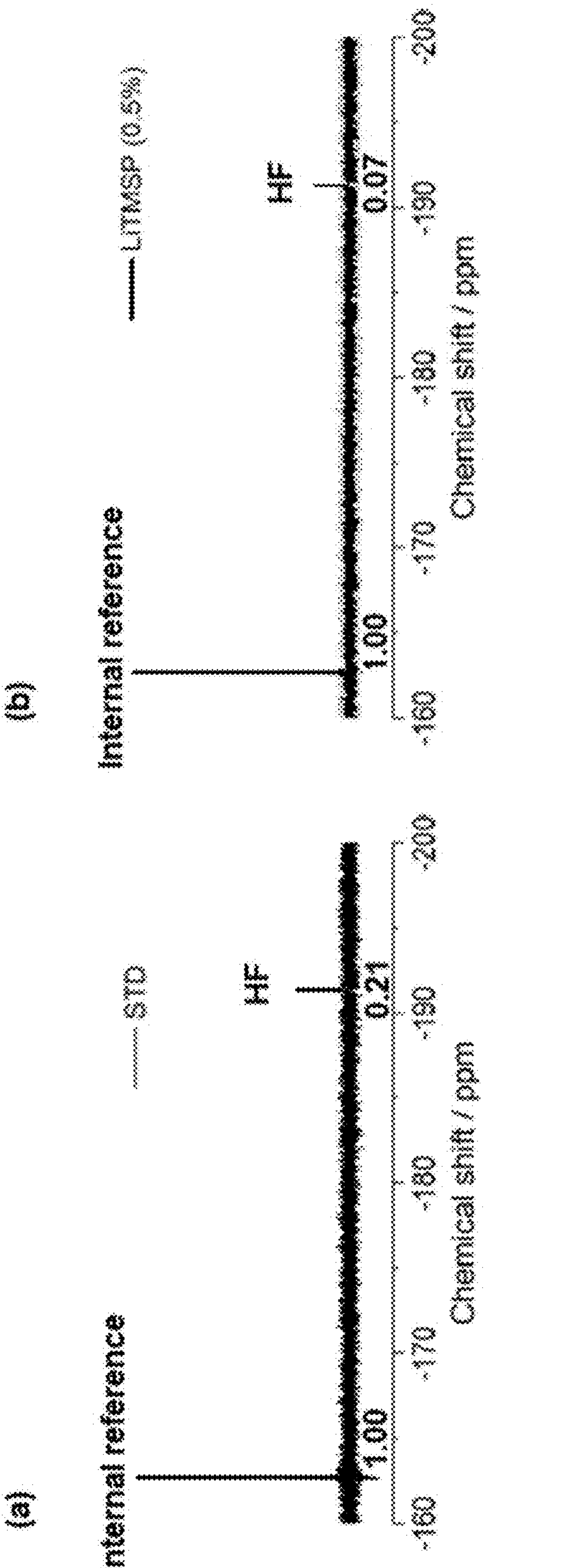
FIG. 8 shows $^{19}$F NMR spectra of STD and LTMSP (0.5%) electrolytes collected from the LNMO/Gr cells after 100 cycle at 45° C.

As shown in $^{19}$F-NMR spectra (FIG. 8), the HF can be observed in both cycled STD and LiTMSP electrolytes. It has been reported that the HF can be generated upon cycling by hydrolysis of water which was produced by electrolyte oxidation at high voltage.[17,18] Interestingly, quantitative analysis for the HF concentration after cycling indicates that the relative ratio of the HF peak intensity based on the peak intensity of internal reference (0.011 M $C_6F_6$) is 0.21 (0.4 mM) in STD electrolytes and 0.07 (0.1 mM) in LiTMSP electrolytes implying that the generation of HF upon cycling is reduced by 67%. The decreased resistance of LNMO electrodes after cycling is likely attributed to the suppression of HF by LiTMSP (FIG. 6 (*b*)).

Figure 6:
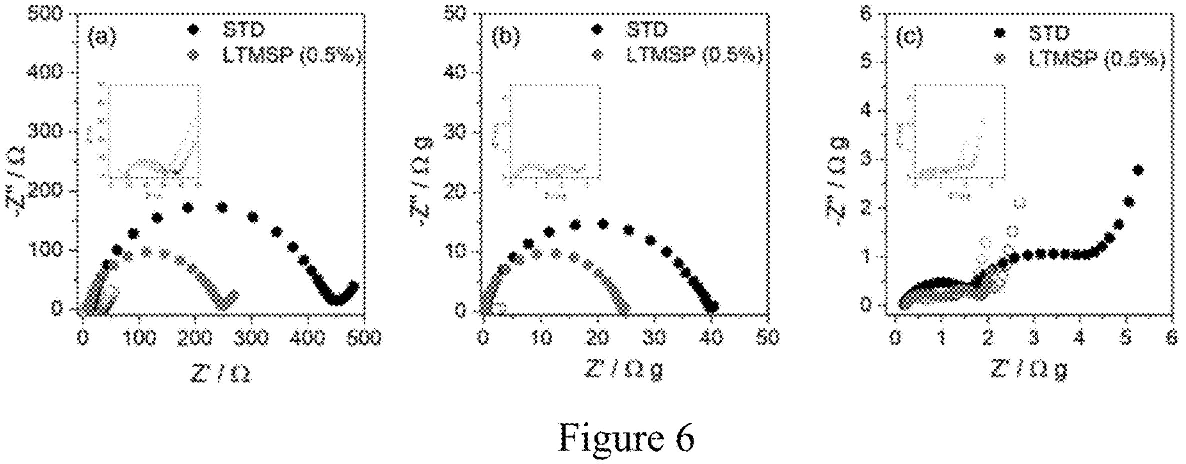
FIG. 6 shows EIS spectra of (a) LNMO/Gr cells, (b) LNMO/LNMO symmetric cells, and (c) Gr/Gr symmetric cells with STD and LTMSP (0.5%) electrolytes after pre-cycling (open, inset) and 100 cycles (solid) at 45° C.

Unlike LNMO electrodes, the surface of the cycled graphite with STD suggests that electrolyte decomposition upon cycling make the resistance ($R_{film}$, $R_{ct}$) of graphite growth with the evidence of dominant peaks related to electrolyte decomposition products of O-species ($CO_3$/C=O at 532 eV, C—O at 533.5 eV) and LiF (685.2 eV) compared to LiTMSP (FIG. 6). The deposition of thick electrolyte decomposition products can be visually observed on the graphite electrodes with STD through FE-SEM (FIGS. 7 (*c*), (*d*)). It has been reported that continuous deterioration and reformation of the surface film are attributed to the migration and deposition of dissolved transition metal ions from the positive electrodes, in which this leads to an increase in film thickness, the polarization of cells and eventual capacity fading.[20-23]

ICP-MS suggests that the concentration of transition metal ions is lower in the cycled graphite electrodes with LiTMSP than with STD, which results from the alleviation of accumulated HF upon cycling by LiTMSP (Table 4). The passivating surface film also effectively mitigates the deposition of transition metal ions on the graphite electrodes.[39-41] To verify if LiTMSP can offer the better passivation ability of the initial surface film, a constant voltage was held at 4.9 V at 45° C. to monitor the current decay of LNMO/graphite cells for 5 h (note that LNMO/graphite cells were fully charged at 25° C.) (FIG. 5 (*f*)). In this experiment, due to the instability of electrolyte at 4.9 V, further electrolyte decomposition (oxidation on the LNMO electrodes, reduction on the graphite electrodes) can occur on the electrodes, which can be monitored through the current. The decaying current of LNMO/graphite cells with LiTMSP is lower that STD, implying the surface film derived by LiTMSP shows better passivation ability which leads to prevent the surface film from the deterioration/reformation caused by migrated transition metal ions. Thus, the decreased resistance of cycled graphite electrodes is likely attributed to the mitigation of dissolved transition metal ions (Table 4) and superior passivation surface film derived by LiMTSP as well (FIG. 5 (*f*)).

TABLE 4

| The concentration of transition metal deposition obtained from graphite electrodes after 100 cycles at 45° C. The concentration of transition metal deposition/ppb | | |
|---|---|---|
| | STD | LTMSP (0.5%) |
| Mn | 1350 | 1010 |
| Ni | 530 | 200 |

CONCLUSIONS

LiTMSP was synthesized and investigated as a bi-functional additive (HF scavenging, film-forming) for high voltage LNMO/graphite cell. The beneficial effects of LiTMSP are summarized below.

LiTMSP was synthesized by thermolysis of tris(trimethylsilyl) phosphate and lithium tert-butoxide.

The trimethylsilyl functional group in LiTMSP could scavenge HF in electrolyte solution by generating TMS-F, which results in decreasing the metal ion dissolution from the LNMO electrode during cycling at 45° C. As a result, the resistance of LNMO electrode cells after 100 cycles at 45° C. was dramatically decreased with the incorporation of LiTMSP compared to STD.

Thanks to the superior surface film derived by LiTMSP on the graphite electrode, the passivation ability of the surface film is enhanced, which enables further mitigation of electrolyte reductive decomposition and deterioration/reformation caused by migrated metal ions from the LNMO electrode. This leads to a decrease in the resistance of LNMO/graphite cells and improves the cycling performance of LNMO/graphite cells at 45° C.

Besides, the surface film derived by LiTMSP could decrease the resistance of the graphite electrode due to the improved lithium-ions conductivity, offering the better rate performance of LNMO/graphite cells at 25° C.

All patents, patent publications, and other publications referred to in the present application are incorporated herein by reference in their entirety.

REFERENCES (1) Cano, Z. P.; Banham, D.; Ye, S.; Hintennach, A.; Lu, J.; Fowler, M.; Chen, Z. Batteries and Fuel Cells for Emerging Electric Vehicle Markets. *Nat. Energy* 2018, 3 (4), 279-289.

(2) Becker, T. A.; Sidhu, I.; Tenderich, B. *Electric Vehicles in the United States A New Model with Forecasts to* 2030; 2009.

(3) Kim, M.-H.; Shin, H.-S.; Shin, D.; Sun, Y.-K. Synthesis and Electrochemical Properties of Li[Ni0.8Co0.1Mn0.1]O2 and Li[Ni0.8Co0.2]O2 via Co-Precipitation. *J. Power Sources* 2006, 159 (2), 1328-1333.

(4) Noh, H.-J.; Youn, S.; Yoon, C. S.; Sun, Y.-K. Comparison of the Structural and Electrochemical Properties of Layered Li[NixCoyMnz]O2 (x=⅓, 0.5, 0.6, 0.7, 0.8 and 0.85) Cathode Material for Lithium-Ion Batteries. *J. Power Sources* 2013, 233, 121-130.

(5) Schmuch, R.; Wagner, R.; Hörpel, G.; Placke, T.; Winter, M. Performance and Cost of Materials for Lithium-Based Rechargeable Automotive Batteries. *Nat. Energy* 2018, 3 (4), 267-278.

(6) Berckmans, G.; Messagie, M.; Smekens, J.; Omar, N.; Vanhaverbeke, L.; Mierlo, J. Van. Cost Projection of State of the Art Lithium-Ion Batteries for Electric Vehicles Up to 2030. *Energies* 2017, 10 (9), 1314.

(7) Patoux, S.; Daniel, L.; Bourbon, C.; Lignier, H.; Pagano, C.; Le Cras, F.; Jouanneau, S.; Martinet, S. High Voltage Spinel Oxides for Li-Ion Batteries: From the Material Research to the Application. *J. Power Sources* 2009, 189 (1), 344-352.

(8) Takahashi, K.; Saitoh, M.; Sano, M.; Fujita, M.; Kifune, K. Electrochemical and Structural Properties of a 4.7 V-Class LiNi[Sub 0.5]Mn[Sub 1.5]O[Sub 4] Positive Electrode Material Prepared with a Self-Reaction Method. *J. Electrochem. Soc.* 2004, 151 (1), A173.

(9) Zhong, Q. Synthesis and Electrochemistry of LiNi[Sub x]Mn[Sub 2-x]O[Sub 4]. *J. Electrochem. Soc.* 1997, 144 (1), 205.

(10) Ohzuku, T.; Takeda, S.; Iwanaga, M. Solid-State Redox Potentials for Li[Me1/2Mn3/2]O4 (Me: 3d-Transition Metal) Having Spinel-Framework Structures: A Series of 5 Volt Materials for Advanced Lithium-Ion Batteries. *J. Power Sources* 1999, 81-82, 90-94.

(11) Carlier, D.; Van der Ven, A.; Delmas, C.; Ceder, G. First-Principles Investigation of Phase Stability in the O2-LiCoO2 System. *Chem. Mater.* 2003, 15 (13), 2651-2660.

(12) Reimers, J. N. Electrochemical and In Situ X-Ray Diffraction Studies of Lithium Intercalation in Li[Sub x]CoO[Sub 2]. *J. Electrochem. Soc.* 1992, 139 (8), 2091.

(13) Yang, L.; Ravdel, B.; Lucht, B. L. Electrolyte Reactions with the Surface of High Voltage LiNi 0.5Mn1.5O4 Cathodes for Lithium-Ion Batteries. *Electrochem. Solid-State Lett.* 2010, 13 (8), A95.

(14) Yoon, T.; Lee, T.; Soon, J.; Jeong, H.; Jurng, S.; Ryu, J. H.; Oh, S. M. The Investigation of Electrolyte Oxidation and Film Deposition Characteristics at High Potentials in a Carbonate-Based Electrolyte Using Pt Electrode. *J. Electrochem. Soc.* 2018, 165 (5), A1095-A1098.

(15) Lee, T. J.; Kim, H.; Hwang, H. S.; Soon, J.; Jung, J.; Ryu, J. H.; Oh, S. M. Solid Permeable Interface (SPI) on a High-Voltage Positive Electrode of Lithium-Ion Batteries. *J. Electrochem. Soc.* 2018, 165 (3), A575-A583.

(16) Kumai, K.; Miyashiro, H.; Kobayashi, Y.; Takei, K.; Ishikawa, R. Gas Generation Mechanism Due to Electrolyte Decomposition in Commercial Lithium-Ion Cell. *J. Power Sources* 1999, 81-82, 715-719.

(17) Lux, S. F.; Lucas, I. T.; Pollak, E.; Passerini, S.; Winter, M.; Kostecki, R. The Mechanism of HF Formation in $LiPF_6$ Based Organic Carbonate Electrolytes. *Electrochem. commun.* 2012, 14 (1), 47-50.

(18) Qi, X.; Tao, L.; Hahn, H.; Schultz, C.; Gallus, D. R.; Cao, X.; Nowak, S.; Röser, S.; Li, J.; Cekic-Laskovic, I.; Rad, B. R.; Winter, M. Lifetime Limit of Tris(Trimethylsilyl) Phosphite as Electrolyte Additive for High Voltage Lithium Ion Batteries. *RSC Adv.* 2016, 6 (44), 38342-38349.

(19) Yang, H.; Zhuang, G. V.; Ross, P. N. Thermal Stability of $LiPF_6$ Salt and Li-Ion Battery Electrolytes Containing $LiPF_6$. *J. Power Sources* 2006, 161 (1), 573-579.

(20) Pieczonka, N. P. W.; Liu, Z.; Lu, P.; Olson, K. L.; Moote, J.; Powell, B. R.; Kim, J. H. Understanding Transition-Metal Dissolution Behavior in LiNi 0.5Mn1.5O4 High-Voltage Spinel for Lithium Ion Batteries. *J. Phys. Chem. C* 2013, 117 (31), 15947-15957.

(21) Manthiram, A.; Chemelewski, K.; Lee, E. S. A Perspective on the High-Voltage LiMn1.5Ni0.5O4 Spinel Cathode for Lithium-Ion Batteries. In *Energy and Environmental Science*; Royal Society of Chemistry, 2014; Vol. 7, pp 1339-1350.

(22) Kim, J.-H.; Pieczonka, N. P. W.; Li, Z.; Wu, Y.; Harris, S.; Powell, B. R. Understanding the Capacity Fading Mechanism in $LiNi_{0.5}Mn_{1.5}O_4$/Graphite Li-Ion Batteries. *Electrochim. Acta* 2013, 90, 556-562.

(23) Lu, D.; Xu, M.; Zhou, L.; Garsuch, A.; Lucht, B. L. Failure Mechanism of Graphite/LiNi 0.5 Mn1.5 O 4 Cells at High Voltage and Elevated Temperature. *J. Electrochem. Soc.* 2013, 160 (5), A3138-A3143.

(24) Han, J. G.; Jeong, M. Y.; Kim, K.; Park, C.; Sung, C. H.; Bak, D. W.; Kim, K. H.; Jeong, K. M.; Choi, N. S. An Electrolyte Additive Capable of Scavenging HF and PF5 Enables Fast Charging of Lithium-Ion Batteries in $LiPF_6$-Based Electrolytes. *J. Power Sources* 2020, 446, 227366.

(25) Han, J.; Kim, K.; Lee, Y.; Choi, N. Scavenging Materials to Stabilize LiPF 6-Containing Carbonate-Based Electrolytes for Li-Ion Batteries. *Adv. Mater* 2019, 31 (20), 1804822.

(26) Kim, J.; Kim, H.; Lee, J. G.; Jeong, H.; Ryu, J. H.; Oh, S. M. Communication—A Phosphorus Pentafluoride Scavenger to Suppress Solid Electrolyte Interphase Damage at Moderately Elevated Temperature. *J. Electrochem. Soc.* 2017, 164 (14), A3699-A3701.

(27) Xu, M.; Hao, L.; Liu, Y.; Li, W.; Xing, L.; Li, B. Experimental and Theoretical Investigations of Dimethylacetamide (DMAc) as Electrolyte Stabilizing Additive for Lithium Ion Batteries. *J. Phys. Chem. C* 2011, 115 (13), 6085-6094.

(28) Jang, S. H.; Jung, K.; Yim, T. Silyl-Group Functionalized Organic Additive for High Voltage Ni-Rich Cathode Material. *Curr. Appl. Phys.* 2018, 18 (11), 1345-1351.

(29) Wotango, A. S.; Su, W. N.; Leggesse, E. G.; Haregewoin, A. M.; Lin, M. H.; Zegeye, T. A.; Cheng, J. H.; Hwang, B. J. Improved Interfacial Properties of MCMB Electrode by 1-(Trimethylsilyl)Imidazole as New Electrolyte Additive to Suppress $LiPF_6$ Decomposition. *ACS Appl. Mater. Interfaces* 2017, 9 (3), 2410-2420.

(30) Yim, T.; Han, Y. K. Tris(Trimethylsilyl) Phosphite as an Efficient Electrolyte Additive to Improve the Surface Stability of Graphite Anodes. *ACS Appl. Mater. Interfaces* 2017, 9 (38), 32851-32858.

(31) Milien, M. S.; Beyer, H.; Beichel, W.; Klose, P.; Gasteiger, H. A.; Lucht, B. L.; Krossing, I. Lithium Bis(2,2,2-Trifluoroethyl)Phosphate Li[O2P(OCH2CF3) 2]: A High Voltage Additive for LNMO/Graphite Cells. *J. Electrochem. Soc.* 2018, 165 (11), A2569-A2576.

(32) Milien, M. S.; Tottempudi, U.; Son, M.; Ue, M.; Lucht, B. L. Development of Lithium Dimethyl Phosphate as an Electrolyte Additive for Lithium Ion Batteries. *J. Electrochem. Soc.* 2016, 163 (7), A1369-A1372.

(33) Yang, G.; Shi, J.; Shen, C.; Wang, S.; Xia, L.; Hu, H.; Luo, H.; Xia, Y.; Liu, Z. Improving the Cyclability Performance of Lithium-Ion Batteries by Introducing Lithium Difluorophosphate (LiPO 2 F 2) Additive. *RSC Adv.* 2017, 7 (42), 26052-26059.

(34) Dong, Y.; Young, B. T.; Zhang, Y.; Yoon, T.; Heskett, D. R.; Hu, Y.; Lucht, B. L. Effect of Lithium Borate Additives on Cathode Film Formation in $LiNi_{0.5}Mn_{1.5}O_4$/Li Cells. *ACS Appl. Mater. Interfaces* 2017, 9 (24), 20467-20475.

(35) Lee, T. J.; Soon, J.; Chae, S.; Ryu, J. H.; Oh, S. M. A Bifunctional Electrolyte Additive for High-Voltage LiNi 0.5 Mn 1.5 O 4 Positive Electrodes. *ACS Appl. Mater. Interfaces* 2019, 11 (12), 11306-11316.

(36) Song, Y. M.; Han, J. G.; Park, S.; Lee, K. T.; Choi, N. S. A Multifunctional Phosphite-Containing Electrolyte for 5 V-Class LiNi 0.5Mn1.5O4 Cathodes with Superior Electrochemical Performance. *J. Mater. Chem. A* 2014, 2 (25), 9506-9513.

(37) Yang, J.; Shkrob, I.; Liu, K.; Connell, J.; Dietz Rago, N. L.; Zhang, Z.; Liao, C. 4-(Trimethylsilyl) Morpholine as a Multifunctional Electrolyte Additive in High Voltage Lithium Ion Batteries. *J. Electrochem. Soc.* 2020, 167 (7), 70533.

(38) Xie, S.; Manuguri, S.; Proietti, G.; Romson, J.; Fu, Y.; Inge, A. K.; Wu, B.; Zhang, Y.; Häll, D.; Ramström, O.; Yan, M. Design and Synthesis of Theranostic Antibiotic Nanodrugs That Display Enhanced Antibacterial Activity and Luminescence. *Proc. Natl. Acad. Sci.* U.S.A. 2017, 114 (32), 8464-8469.

(39) Amine, K.; Chen, Z.; Zhang, Z.; Liu, J.; Lu, W.; Qin, Y.; Lu, J.; Curtis, L.; Sun, Y. K. Mechanism of Capacity Fade of MCMB/Li1.1[Ni1/3Mn 1/3Co1/3]0.9O2 Cell at Elevated Temperature and Additives to Improve Its Cycle Life. *J. Mater. Chem.* 2011, 21 (44), 17754-17759.

(40) Yamagiwa, K.; Morita, D.; Yabuuchi, N.; Tanaka, T.; Fukunishi, M.; Taki, T.; Watanabe, H.; Otsuka, T.; Yano, T.; Son, J. Y.; Cui, Y. T.; Oji, H.; Komaba, S. Improved Higherature Performance and Surface Chemistry of Graphite/LiMn2O4 Li-Ion Cells by Fluorosilane-Based Electrolyte Additive. *Electrochim. Acta* 2015, 160, 347-356.

(41) Wu, S.; Lin, Y.; Xing, L.; Sun, G.; Zhou, H.; Xu, K.; Fan, W.; Yu, L.; Li, W. Stabilizing LiCoO2/Graphite at High Voltages with an Electrolyte Additive. *ACS Appl. Mater. Interfaces* 2019, 11 (19), 17940-17951.

The invention claimed is:

1. A lithium ion battery comprising a positive electrode, a negative electrode and an electrolyte, wherein the electrolyte comprises lithium bis(trimethylsilyl) phosphate (LiTMSP) as an additive, wherein the LiTMSP is prepared by thermolysis of tris(trimethylsilyl) phosphate and lithium tert-butoxide, and the content of LiTMSP in the electrolyte is from 0.5 wt % to 1.0 wt %.

2. The lithium ion battery according to claim 1, wherein the positive electrode is $LiNi_{0.5}Mn_{1.5}O_4$ (LNMO) electrode, and/or the negative electrode is a graphite electrode.

3. The lithium ion battery according to claim 1, wherein the electrolyte comprises lithium hexafluorophosphate ($LiPF_6$).

* * * * *